May 20, 1952

A. S. BROWN ET AL 2,597,284

ENDLESS TRANSMISSION BELT

Filed Oct. 22, 1948

Inventors
ARTHUR S. BROWN
GERTRUDE E. SEDGLEY

By Louis C. Smith

Attorney

Inventors
ARTHUR S. BROWN
GERTRUDE E. SEDGLEY

By  *Louis C. Smith*
Attorney

Patented May 20, 1952

2,597,284

UNITED STATES PATENT OFFICE 2,597,284

ENDLESS TRANSMISSION BELT

Arthur S. Brown, Tilton, and Gertrude E. Sedgley, Concord, N. H.

Application October 22, 1948, Serial No. 55,994

1 Claim. (Cl. 74—232)

This invention relates to the manufacture of plural ply endless transmission belts of the type illustrated and described in United States Patent No. 2,256,756, September 23, 1941.

The belt disclosed in said patent comprises an inner wear-receiving ply of woven fabric, an endless and seamless outer load-supporting ply of tubular woven fabric, and an intermediate ply of rubber which is situated between the inner and outer plies and binds them together, the outer ply presenting a weft element in the form of a single unbroken cord extending repeatedly around the ply with the turns of the cord lying parallel and bound together by relatively small warp threads having free ends at the edges of the belt.

In said belt one end of the continuous weft cord lies in one edge of the belt, and the other end lies in the other edge of the belt.

Experience has shown that the edge wear to which a transmission belt of this type is subjected when in use is apt to cause the ends of the weft cord, which are exposed in the edges of the belt, to become loosened thereby producing a belt with a frayed edge.

It is one of the objects of the present invention to provide a novel belt of the above type in which the turns of the weft cord at the edges of the belt will be protected against wear resulting from edge wear to which the belt may be subjected.

A further object of the invention is to provide a belt of the above type in which the ends of the warp threads of the outer ply, as well as the ends of the cord weft element, are embedded in the intermediate rubber ply, and hence are protected against edge wear to which the belt may be subjected when in use.

A further object of the invention is to provide a novel method of making a belt having these improvements.

In order to give an understanding of the invention, there is shown in the drawings one embodiment thereof which will now be described and the novel features of which will be pointed out in the appended claims.

Figure 1:
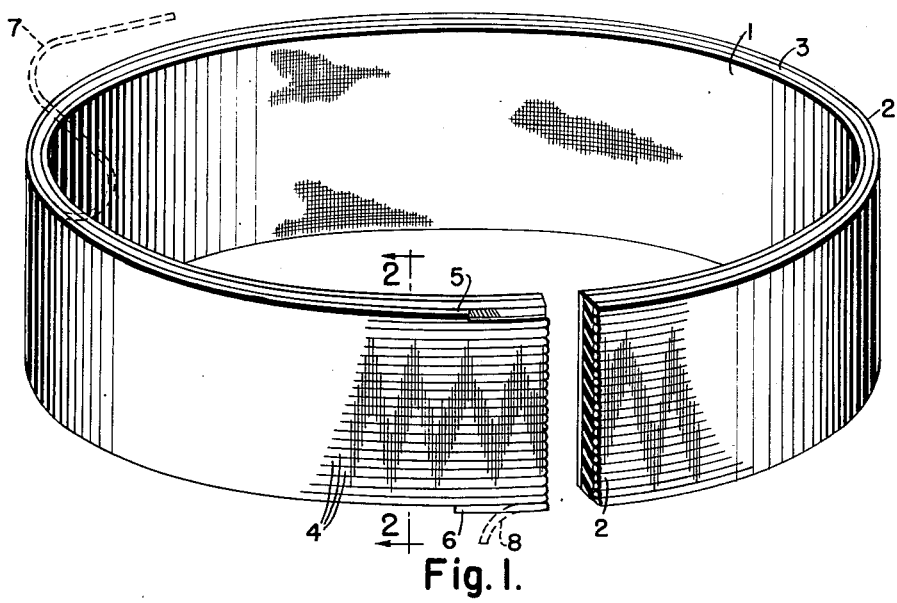
Fig. 1 is a perspective view illustrating a belt made in accordance with the above-mentioned Patent No. 2,256,756.

Fig. 1 illustrates a transmission belt made in accordance with the above-mentioned Patent No. 2,256,756. This belt is a three-ply belt comprising an inner ply 1 of fabric, an outer ply 2 of an endless and seamless woven tubular fabric having a special construction, and an intermediate ply 3 of rubber which is situated between the inner and outer plies 1 and 2 and binds them together. The inner ply 1 may be in the form of an endless and seamless woven tubular fabric or it may be made from a strip of fabric having its ends spliced together.

The outer ply 2 which constitutes the load-supporting ply of the belt is one in which the weft element is in the form of a cord 4 which extends repeatedly around the ply with the turns in parallel relation, said turns being bound together by relatively small warp threads 10 which have free ends lying in the edge of the fabric. In this belt, as described in said patent, one end 5 of the weft cord element will be exposed in one edge of the belt, and the other end 6 of said endless cord weft element will be exposed in the other edge of the belt.

It has been found that the edge wear to which a transmission belt is sometimes subjected is apt to loosen the ends 5 and 6 of the weft element 4 of the outer ply, thereby producing a frayed condition in the edge of the belt, and as stated above, one object of the present invention is to provide an improvement in the belt illustrated in Fig. 1 by which the edge turns of the weft element 4 will be protected from edge wear.

This end is accomplished by first raveling one or more turns of the weft cord 4 from each edge of the belt, this operation leaving the ends 11 of the warp threads 10 in a more or less tangled condition and exposing the edge portions of the intermediate ply 3 of rubber. This operation of raveling the end turns of the weft cord from the outer ply is illustrated in Fig. 1 wherein the dotted line 7 indicates the beginning of the operation of raveling the end 5 of the weft cord 4 from one edge of the belt, and the dotted line 8 illustrates the start of the operation of raveling the end 6 of the weft cord from the other edge of the belt. As stated above, this raveling operation may be continued until one or more turns of the weft cord have been removed from each edge of the belt, after which the raveled portion of the weft cord is cut close to the surface of the belt.

Figure 2:
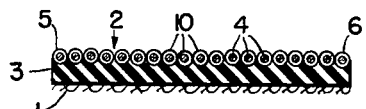
Fig. 2 is a section on the line 2—2, Fig. 1.
Figure 3:
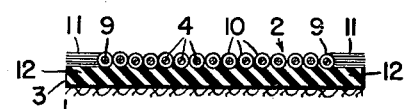
Fig. 3 is a sectional view similar to Fig. 2 but illustrating the condition of the belt after one or two turns of the weft cord has been raveled from the outer ply.
Figure 6:
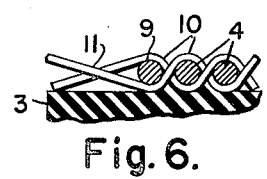
Fig. 6 is an enlarged fragmentary sectional view illustrating a portion of one edge of the belt after one or two turns of the weft cord has been raveled therefrom.

In Fig. 2, which is a section of a belt made in accordance with the above-mentioned patent, the edge turns 5 and 6 of the weft cord 4 stand flush with the edge of the belt. After one or more of the edge turns of the weft cord have been raveled from the belt, it will have the appearance shown in Fig. 3 wherein the outside turn 9 of the weft cord 4 remaining on the belt at each edge will be situated a distance in from the edge of the rubber ply. The ends 11 of the relatively small warp threads 10, which were interwoven with the turns of the weft cord that has been removed, become more or less entangled with each other during the raveling operation. Fig. 6, which is a fragmentary sectional view on a greatly enlarged scale, shows the extended ends 11 of the warp threads which remain after two turns of the weft cord 4 has been raveled from the edge of the belt, and as stated above, such raveling operation naturally causes these free ends of the warp threads to become more or less entangled with each other.

After the end turns of the cord weft element have thus been raveled from the edges of the belt, then the belt with the raveled edge is dipped in a vulcanizable rubber compound which tends to further entangle the warp ends 11 and felt them together.

Figure 4:
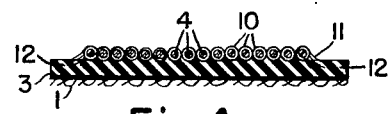
Fig. 4 is a section similar to Fig. 3 but showing the ends of the warp threads embedded in the rubber ply.
Figure 5:
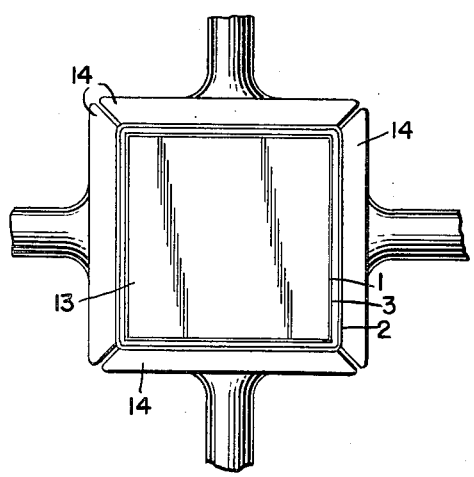
Fig. 5 is a view illustrating a platen press in which the belt is subjected to pressure and in which it may be vulcanized.
Figure 7:
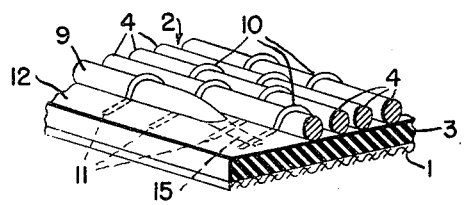
Fig. 7 is a fragmentary perspective sectional view illustrating one end of the weft cord and the ends of the warp threads embedded in the rubber layer.

The belt is then subjected to a vulcanization process under pressure during which the cut ends of the cord element as well as the entangled ends 11 of the warp threads are embedded in the exposed edge portion 12 of the rubber ply 3 which extends beyond the edge turns 9 of the outer ply 2 as seen in Figs. 4 and 7. Any suitable press may be used for this step of embedding the ends of the weft cord and the tangled ends of the warp threads in the edge portions 12 of the intermediate ply 3, but there is illustrated in Fig. 5 a press having a rectangular platen element 13 around which the belt may be placed, and pressure members 14 arranged to press the belt against the platen member 13 and to apply the requisite pressure on the tangled ends 11 of the warp threads 10 and the cut ends of the weft cord 4 to embed them in the rubber ply 3, it being understood that the press will be properly heated so as to effect the vulcanizing operation.

With the above described improvement a belt is produced in which the edge turns 9 of the weft cord element of the outer ply are situated inside of the edge of the belt and these edge turns 9 are protected from edge wear partly by the fact that the ends 11 of the warp threads are embedded in the rubber ply and partly by the fact that the ends 15 of the cord element 4 are also embedded in the rubber ply by the pressing and vulcanizing operation as illustrated in Fig. 7. Moreover the edge turn of the outer ply 2 at each edge of the belt is securely held in place by reason of the fact that the free ends 11 of the warp threads 10 are locked to the rubber ply 3 by being embedded therein.

When a belt having this improvement is in use, any edge wear to which the edges of the belt are subjected will come on the edges of the inner ply 1 and the edges of the rubber ply 3, and the outer ply 2 will not be subjected to undesirable edge wear.

Figure 8:
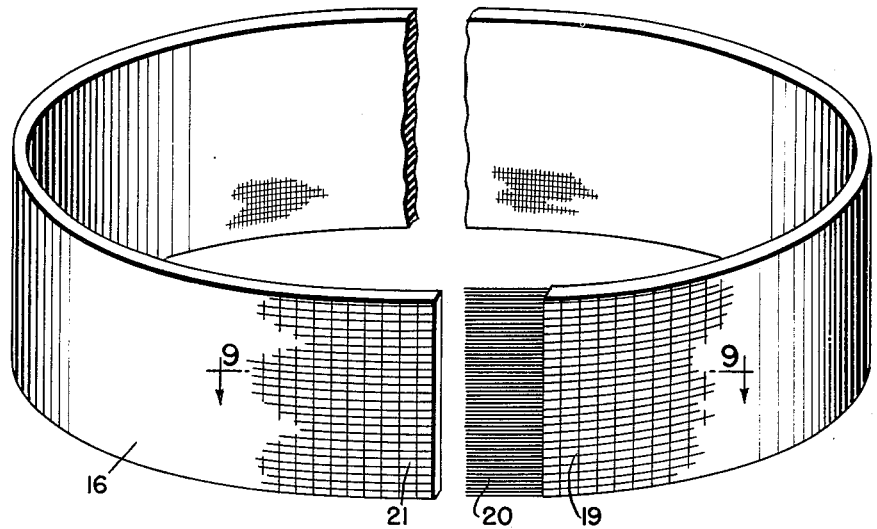
Figs. 8 and 9 are fragmentary perspective views illustrating one way of making the inner wear-receiving ply from a strip of fabric.
Figure 9:
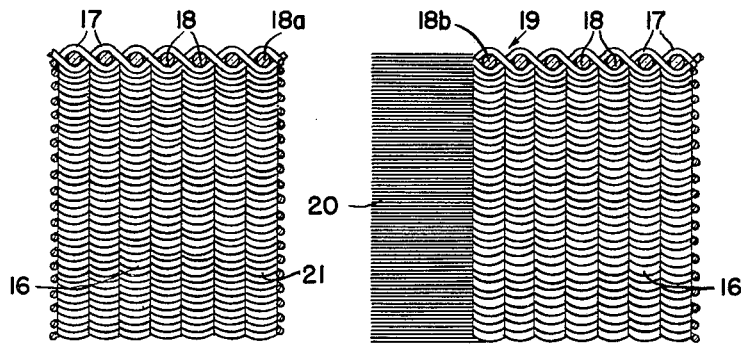
Figure 10:
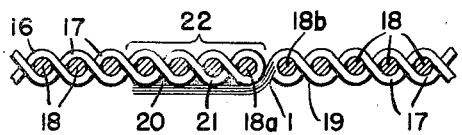
Fig. 10 is a sectional view illustrating the manner in which the ends of the strip are spliced.

As stated above the inner ply 1 may either be made from a tubular woven fabric, in which case said inner ply would be an endless seamless ply, or it may be made from a strip of fabric having its ends spliced together. A suitable construction of a spliced inner ply is illustrated in Figs. 8, 9 and 10. In said figures 16 indicates a length of fabric formed by interweaving the warp threads 17 and weft or filling threads 18. In this particular fabric the filling threads are somewhat larger than the warp threads and extend transversely of the strip. In making the inner ply of the improved belt, the filling threads 18 are raveled from one end 19 of the strip 16 for a suitable distance thereby leaving the projecting warp thread ends 20 as shown in Figs. 8 and 9. The two ends of this strip are then spliced to produce the inner ply 1 by placing the projecting warp thread ends 20 in overlapping relation with the unraveled end 21 of the strip 16 as shown in Fig. 10 and then adhesively uniting said projecting warp thread ends to the end 21 of the strip. In thus making the splice, the filling thread 18a at the edge of the end 21 of the strip is placed closely adjacent the end filling thread 18b of the raveled end 19 so that the joint is practically invisible. Since the warp threads 17 are considerably smaller than the filling threads 18, the portion 22 of the spliced belt in which the projecting warp thread ends overlie the unraveled end of the strip is not appreciably thicker than other portions of said strip and therefore when an inner ply which is made in this way is embodied in the completed belt, the splice in the inner ply will not be apparent.

The splice will preferably be made so that the projecting portions of the warp threads lie on the outside of the completed ply and will thus be in contact with the inner face of the intermediate ply of rubber.

We claim:

An endless power transmission belt comprising an inner ply of fabric which constitutes the wear surface of the belt, an endless and seamless outer load-supporting ply of tubular woven fabric, the weft element of which is a single continuous unbroken cord extending repeatedly around the ply with the adjacent turns of the cord lying parallel and closely together and held in their parallel arrangement by relatively small warp threads which are interwoven with the turns of the cord and which have free ends extending beyond the edge turn of the weft cord at each edge of the belt, and an intermediate ply of rubber which is situated between the inner and outer plies and is vulcanized to both of them, the outer load-supporting ply being narrower than the intermediate ply of rubber and the latter being exposed on the outer side of the belt at each edge thereof, the extending free ends of the small warp threads being embedded in the exposed edge portions of the intermediate rubber ply and thereby securely retaining the edge turns of said load-supporting ply in place.

ARTHUR S. BROWN.
GERTRUDE E. SEDGLEY.

REFERENCES CITED

The following references are of record in the file of this patent:

UNITED STATES PATENTS

| Number | Name | Date |
|---|---|---|
| 336,990 | Chase | Mar. 2, 1886 |
| 567,948 | Bracher | Sept. 15, 1896 |
| 1,219,151 | Reed | Mar. 13, 1917 |
| 1,261,118 | Geisel | Apr. 2, 1918 |
| 2,256,756 | Brown | Sept. 23, 1941 |